US012668464B2

(12) United States Patent
Mohr

(10) Patent No.: US 12,668,464 B2
(45) Date of Patent: Jun. 30, 2026

(54) LIFTING DEVICE FOR LIFTING AND LOWERING LOADS

(71) Applicant: Mohr Lizenz Verwaltungs GmbH, Bielefeld (DE)

(72) Inventor: Christoph Mohr, Bielefeld (DE)

(73) Assignee: Mohr Lizenz Verwaltungs GmbH, Bielefeld (DE)

( * ) Notice: Subject to any disclaimer, the term of this patent is extended or adjusted under 35 U.S.C. 154(b) by 315 days.

(21) Appl. No.: 18/682,696

(22) PCT Filed: Sep. 22, 2021

(86) PCT No.: PCT/EP2021/076040
§ 371 (c)(1),
(2) Date: Feb. 9, 2024

(87) PCT Pub. No.: WO2023/046276
PCT Pub. Date: Mar. 30, 2023

(65) Prior Publication Data
US 2024/0343537 A1 Oct. 17, 2024

(51) Int. Cl.
*B66F 7/00* (2006.01)
*B66F 7/02* (2006.01)
*B66F 7/28* (2006.01)

(52) U.S. Cl.
CPC . *B66F 7/02* (2013.01); *B66F 7/28* (2013.01)

(58) Field of Classification Search
CPC . B66F 7/065; B66F 7/00; B66C 1/125; B66C 13/00; B66C 13/06
See application file for complete search history.

(56) References Cited

U.S. PATENT DOCUMENTS 10,737,915 B2 * 8/2020 Mohr ...................... B66C 13/06
2019/0092605 A1 * 3/2019 Mohr ...................... B66C 13/08
(Continued)

FOREIGN PATENT DOCUMENTS

EP 1106563 A2 6/2001
EP 1273549 A1 1/2003
(Continued)

OTHER PUBLICATIONS

WIPO, International Search Report (in a corresponding application), May 24, 2022.

*Primary Examiner* — Lee D Wilson
(74) *Attorney, Agent, or Firm* — Laurence P. Colton; Smith Tempel Blaha LLC

(57) ABSTRACT

A lifting device having two frame assemblies which lie vertically over each other, the lower frame assembly being suspended on the upper frame assembly via a lifting pulling device that can be wound by a lifting/lowering device. To stabilize the lower frame assembly in a first lateral direction, the lifting pulling device is diverted at least once over the extension thereof such that a diagonal section, running in an inclined manner relative to vertical, of the lifting pulling device crosses a directly adjacent diagonal section of another lifting pulling device, the other diagonal section running in an oppositely inclined manner. A diagonal pulling device, which can be wound by a tensioning device, extends between the two frame assemblies, two directly adjacent diagonal pulling devices crossing each other such that the second frame assembly is also stabilized in a second lateral direction with respect to the upper frame assembly.

11 Claims, 2 Drawing Sheets

(56) References Cited

U.S. PATENT DOCUMENTS

| | | | | |
|---|---|---|---|---|
| 2019/0127187 | A1 | 5/2019 | Klapper | |
| 2020/0346906 | A1* | 11/2020 | Mohr | B66C 13/06 |
| 2024/0343537 | A1* | 10/2024 | Mohr | B66C 13/06 |

FOREIGN PATENT DOCUMENTS

| | | | |
|---|---|---|---|
| EP | 3461782 | A1 | 4/2019 |
| WO | 2010061645 | A1 | 6/2010 |

* cited by examiner

LIFTING DEVICE FOR LIFTING AND LOWERING LOADS

CROSS REFERENCE TO RELATED APPLICATIONS

This application is the US National Phase of and claims the benefit of and priority on International Application No. PCT/EP2021/076040 having an international filing date of 22 Sep. 2021.

BACKGROUND OF THE INVENTION

Technical Field

The invention relates to a lifting apparatus for raising and lowering loads or heavy loads, comprising two frame assemblies which are positioned one above the other with respect to a vertical direction, in particular are or can be oriented so as to be in parallel with one another, the lower frame assembly of which is arranged suspended on the upper frame assembly by lifting and pulling means, such that the lower frame assembly can be raised on the upper frame assembly by winding the lifting and pulling means using a raising and lowering device, and can be lowered with respect to the upper frame assembly by unwinding the lifting and pulling means, each of the lifting and pulling means being deflected at least once in the extension thereof in order to stabilize the lower frame assembly, which can undergo excursion, with respect to the upper frame assembly, in at least one first lateral direction which is transverse to the vertical direction, such that a diagonal portion of each lifting and pulling means, which extends so as to be inclined relative to the vertical direction as a result, intersects with such a diagonal portion of another lifting and pulling means, which portion is directly adjacent and extends in a manner inclined in the opposite direction.

Prior Art

Lifting apparatuses are used for vertical raising and lowering of loads with respect to a vertical direction. Said apparatuses can be operated both manually and in a motorized manner. In addition to the manipulation in the vertical direction, lifting apparatuses of this kind usually also present the possibility of being extended in at least one transverse direction, in order to be able to move loads in space. This can be achieved for example by rotation of a boom of the lifting apparatus and/or by the lateral displacement thereof.

Combination with an overhead track makes it possible for an otherwise stationary lifting apparatus to also be displaceable along a structurally fixed path. Arranged within a factory or at a factory premises or place of transshipment, it is thus possible for heavy loads, such as loaded containers or entire vehicles, to also be moved safely.

A lifting apparatus is known from each of EP 1 273 549 B1 and EP 1 106 563 A2, which apparatus is used for raising and lowering in particular heavy objects. Each of said lifting apparatuses comprises two frame assemblies which are positioned one above the other with respect to a vertical direction, in particular are or can be oriented so as to be in parallel with one another. The lower frame assembly is arranged suspended on the upper frame assembly by lifting and pulling means, such that the lower frame assembly can be raised on the upper frame assembly by winding the lifting and pulling means using a motorized raising and lowering device, and can be lowered with respect to the upper frame assembly by unwinding the lifting and pulling means. In order to stabilize the lower frame assembly, which can undergo excursion, with respect to the upper frame assembly, in at least one first lateral direction which is transverse to the vertical direction, each of said lifting and pulling means is deflected at least once in the extension thereof. In this case, the deflection of the lifting and pulling means takes place such that a diagonal portion of each lifting and pulling means, which extends so as to be inclined relative to the vertical direction as a result, intersects with such a diagonal portion of another lifting and pulling means, which portion is directly adjacent and extends in a manner inclined in the opposite direction.

Deflection of the necessarily required lifting and pulling means makes it possible to simultaneously use said means to laterally stabilize, relative to the upper frame assembly, the lower frame assembly which is suspended on the upper frame assembly in a quasi-dangling manner. In contrast, on account of the structural catenation of the lifting movement with the lateral stabilization it is not possible to influence the inclination of the lower frame assembly with respect to the upper frame assembly. This may sometimes be necessary in order to be able to purposely counteract oscillations and/or inclination arising during operation, in particular during movement. In view of this observation, the lifting apparatuses known hitherto therefore still have room for improvement.

BRIEF SUMMARY OF THE INVENTION

The problem addressed by the present invention is therefore that of developing a lifting apparatus of the type in question such that said apparatus allows for at least limited active excursion control of the lower frame assembly thereof, despite use of the lifting and pulling means for lateral stabilization by means of deflection.

According to the invention, this problem is solved by a lifting apparatus for raising and lowering loads or heavy loads, comprising two frame assemblies which are positioned one above the other with respect to a vertical direction, in particular are or can be oriented so as to be in parallel with one another, the lower frame assembly of which is arranged suspended on the upper frame assembly by lifting and pulling means, such that the lower frame assembly can be raised on the upper frame assembly by winding the lifting and pulling means using a raising and lowering device, and can be lowered with respect to the upper frame assembly by unwinding the lifting and pulling means, each of the lifting and pulling means being deflected at least once in the extension thereof in order to stabilize the lower frame assembly, which can undergo excursion, with respect to the upper frame assembly, in at least one first lateral direction which is transverse to the vertical direction, such that a diagonal portion of each lifting and pulling means, which extends so as to be inclined relative to the vertical direction as a result, intersects with such a diagonal portion of another lifting and pulling means, which portion is directly adjacent and extends in a manner inclined in the opposite direction, characterized by a course of each lifting and pulling means in its own lifting and pulling means plane, which planes are oriented so as to be side-by-side and so as to be mutually parallel, oblique pulling means, which can be wound and unwound by means of a tensioning device and which in each case extend in one of the oblique pulling means planes which are positioned side-by-side and so as to be mutually parallel, and in this case are oriented so as to be at right angles to the lifting and pulling means planes, extending between the two frame assemblies, of which pulling means two directly adjacent oblique pulling means in each case intersect with one another such that the lower frame assembly, which can undergo excursion relative to the upper frame assembly in a second lateral direction, in particular extending at right angles to the first lateral direction, transversely to the vertical direction, is also stabilized, relative to the upper frame assembly, with respect to said second lateral direction. The dependent claims relate to advantageous embodiments.

The invention first proposes a course of each lifting and pulling means in its own lifting and pulling means plane, said lifting and pulling means planes being oriented so as to be side-by-side and so as to be mutually parallel. This means that each lifting and pulling means is deflected only within its own lifting and pulling means plane, the parallel course of the lifting and pulling means planes causing the diagonal portions of the lifting and pulling means, extending therein in an inclined manner, to bring about stabilization of the lower frame assembly which is effective only with respect to the first lateral direction. Therefore, oblique pulling means extending between the two frame assemblies are additionally provided, which means in each case extend in one of oblique pulling means planes which are positioned side-by-side and so as to be mutually parallel, and in this case are oriented so as to be at right angles to the lifting and pulling means planes. The oblique pulling means can be wound and unwound by means of a tensioning device. In this case, two directly adjacent oblique pulling means each intersect with one another such that the lower frame assembly, which can undergo excursion relative to the upper frame assembly in the first lateral direction and in a second lateral direction, in particular extending at right angles to the first lateral direction, transversely to the vertical direction, is now also stabilized, relative to the upper frame assembly, with respect to said second lateral direction.

In this manner, it is possible to continue to use the lifting and pulling means both for transferring the vertical forces, resulting in particular from receiving a load, between the frame assemblies, and for stabilizing the lower frame assembly with respect to the first lateral direction, while the additional oblique pulling means is used for stabilizing the upper frame assembly with respect to the second lateral direction. The resulting advantage is to be considered that of the oblique pulling means used for stabilization with respect to the second lateral direction being controllable independently of the lifting and pulling means, such that the lower frame assembly can be influenced in an at least limited manner, if required. Furthermore, the lifting and pulling means is no longer deflected in different directions, which increases the wear thereof. In addition, the deflections themselves can be designed more simply for this purpose. In view of the design of the lifting and pulling means, these only have to be able to be deflected about an axis, which allows in particular for the use of belts and/or straps, which inherently have a greater width relative to the thickness thereof.

According to a particularly preferred development of the underlying inventive concept, in each case two lifting and pulling means can be deflected together, towards the lower frame assembly, at a deflection shaft located in the region of the upper frame assembly. A common deflection shaft makes it possible to form a deflection at any point of the upper frame assembly. This is a result of the fact that a deflection shaft requires mounting only at the end, between which it can extend freely, even over larger distances. In contrast, for example separate deflection rollers each require their own mounting, which always requires corresponding proximity to bearing parts of the upper frame assembly.

According to the invention, each lifting and pulling means can be deflected towards the upper frame assembly, at a deflection means located in the region of the lower frame assembly. A deflection means of this kind can preferably be a deflection roller.

With regard to the course of the lifting and pulling means it is considered advantageous, within the context of the invention, for each of said lifting and pulling means to be deflected, at a deflection means located in the region of the upper frame assembly, first towards a deflection means located in the region of the lower frame assembly, and from there towards a deflection shaft located in the region of the upper frame assembly. At least one of the deflection means can preferably be a deflection roller.

It is then preferably possible for each lifting and pulling means to comprise at least one first vertical portion which extends between the deflection means located in the region of the upper frame assembly and the deflection means located in the region of the lower frame assembly, and at least one second vertical portion which extends between the deflection means located in the region of the lower frame assembly and the deflection shaft located in the region of the upper frame assembly. In this case, the two vertical portions can enclose, therebetween, an angle of from 0° to 4°. As a result of this course, the relevant lifting and pulling means forms a looped shape, within which the lower frame assembly can be supported by the relevant deflection means. At least one of the mentioned deflection means can preferably be a deflection roller.

According to a preferred development of the lifting apparatus according to the invention, a free end of each lifting and pulling means can be fixed on the lower frame assembly. End portions of the lifting and pulling means that are opposite said free ends can then be coupled to a lifting shaft of the raising and lowering device which can be rotated by a lifting drive. In this case, the lifting shaft is designed and arranged such that the lifting and pulling means can be wound around the lifting shaft, at least in part, and unwound therefrom.

Alternatively thereto, a free end of each lifting and pulling means can be fixed on the upper frame assembly, while end portions of the lifting and pulling means that are opposite said free ends are coupled to a lifting shaft of the raising and lowering device which can be rotated by a lifting drive. In this case, the lifting shaft is designed and arranged such that the lifting and pulling means can be wound around the lifting shaft, at least in part, and unwound therefrom.

Of course, a combination of the embodiments, referred to above as alternatives, is also conceivable, in the case of which at least one of the lifting and pulling means has one of the alternative arrangements, while at least one of the remaining lifting and pulling means has the other alternative arrangement.

With respect to the above-mentioned alternative embodiments, it is considered advantageous for the lifting and pulling means to be deflected together, towards the lifting shaft of the raising and lowering device located in the region of the upper frame assembly, at a deflection shaft located in the region of the upper frame assembly. This presupposes that the lifting shaft of the raising and lowering device, or the entire raising and lowering device, is located in the region of the upper frame assembly.

According to a further preferred embodiment of the invention, the tensioning device can comprise at least one tensioning drive. This is coupled to at least one tensioning shaft, it then being possible for at least two of the oblique pulling means to be wound around the tensioning shaft, at least in part, and unwound therefrom. It is advantageously possible for the tensioning drive to be mechanically independent of a lifting drive of the raising and lowering device, in order to allow for actuation of the oblique pulling means that is separate from the lifting and pulling means.

In this connection, it is considered advantageous for at least two tensioning shafts to be provided, which shafts in each case at least two of the oblique pulling means can be wound around, at least in part, and from which they can be unwound. Regarding the rotation of the tensioning shafts, necessary therefor, said shafts can be at least indirectly coupled, either to their own tensioning drive in each case, or to a common tensioning drive. One tensioning drive per tensioning shaft is advantageous in that said shafts can be actuated separately from one another, in order to manipulate oblique pulling means in contact therewith. In contrast, a common tensioning drive is advantageous in that such an embodiment makes do with fewer components, and has a correspondingly lower weight. For this purpose, the tensioning shafts can be appropriately coupled to a tensioning drive in a torque-transmitting manner, for example by means of at least one cardan shaft and/or a transmission.

The individual pulling means, i.e., the lifting and pulling means and/or the oblique pulling means, can all be designed differently from one another or identically to one another. It is thus preferably possible for all or at least some pulling means to be a strap or belt or cable or a chain. Of course, combinations thereof are also conceivable, meaning for example construction of an individual pulling means from a strap and a cable. These can contain fibers made of for example metal and/or a plastics material and/or a natural material, or can be formed from at least one thereof.

The lifting apparatus according to the invention, now presented, exhibits extremely advantageous properties with respect to the stability of the lower frame assembly with respect to the upper frame assembly. The known tendency of suspended constructions of this kind for lateral excursions and/or rotational movements about a vertical direction is controlled, according to the invention, by the deflection of the lifting and pulling means, required in any case, with respect to a first lateral direction, while the additional oblique pulling means allows for control, independent thereof, with respect to the second lateral direction which extends transversely thereto.

BRIEF DESCRIPTION OF THE DRAWINGS

Advantageous details and effects of the invention are explained in greater detail in the following, with reference to an embodiment shown schematically in the drawings, in which.

DETAILED DESCRIPTION OF PREFERRED EMBODIMENTS

Figure 1:
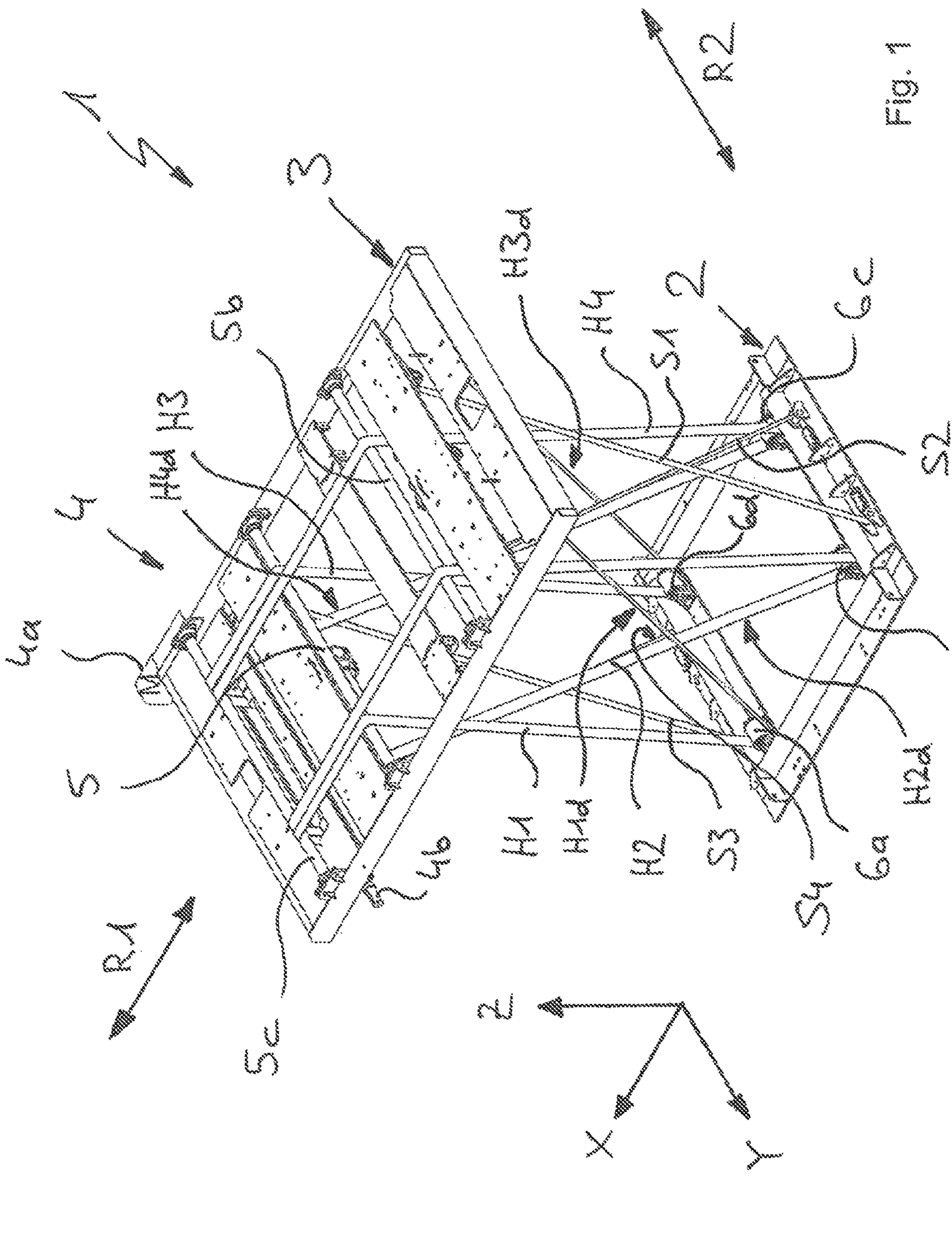
FIG. 1 is a perspective view of a first embodiment of the lifting apparatus according to the invention.

FIG. 1 is a perspective view of a lifting apparatus 1 according to the invention. The lifting apparatus 1 comprises two frame assemblies 2, 3 which each extend so as to be substantially in parallel with a base plane spanned between a longitudinal direction X and a transverse direction Y. In this case, the two frame assemblies 2, 3 are arranged so as to be directly one above the other with respect to a vertical direction Z extending perpendicularly to the base plane. The lower frame assembly 2 shown at the bottom edge with respect to the view in FIG. 1 is arranged so as to be suspended on the upper frame assembly 3, with respect thereto, using individual lifting and pulling means H1-H4, under the effect of gravity. This arrangement allows for the lower frame assembly 2 to be able to be raised on the upper frame assembly 3, in parallel with the vertical direction Z, by means of winding (not shown in greater detail here) of the individual lifting and pulling means H1-H4 using a raising and lowering device 4. The subsequent lowering of the lower frame assembly 2, taking place in the opposite direction, counter to the vertical direction Z, is achieved by the corresponding unwinding of the lifting and pulling means H1-H4 previously wound up, at least in part.

In the present case, the raising and lowering device 4 located in the region of the upper frame assembly 3 comprises a lifting drive 4*a* which is coupled to a lifting shaft 4*b* in a torque-transmitting manner. In this case, the end portions of the lifting and pulling means H1-H4 are connected to the lifting shaft 4*b* such that they can be wound around the lifting shaft 4*b*, at least in part, and unwound therefrom. As can be seen, in each case two of the lifting and pulling means H1, H3; H2, H4 are deflected towards the lower frame assembly 2, at a deflection shaft 5*a*; 5*b* located in the region of the upper frame assembly 3. Specifically, in this case the two outer lifting and pulling means H1, H3 are deflected at the first deflection shaft 5*a*, while the two inner lifting and pulling means H2, H4 are deflected at the second deflection shaft 5*b* which is spaced apart, in parallel, from the first deflection shaft 5*a*, in the plane of the upper frame assembly 3. A further third deflection shaft 5*c* is arranged in the region of the lifting drive 4*a*, on the upper frame assembly 3, and also extends in parallel with the two other deflection shafts 5*a*, 5*b*. In this case, the third deflection shaft 5*c* and the second deflection shaft 5*b* enclose the first deflection shaft 5*a* therebetween. All four lifting and pulling means H1-H4 are deflected together, at the third deflection shaft 5*c*, towards the lifting shaft 4*b* of the raising and lowering device 4.

Proceeding from the associated deflection shaft 5*a*, 5*b*, each of the four lifting and pulling means H1-H4 is first deflected towards the lower frame assembly 2, and from there back again towards the upper frame assembly 3. For this purpose, a deflection means in the form of a deflection roller 6*a*-6*d* is provided in the region of each corner of the lower frame assembly 2, from where each of the lifting and pulling means H1-H4 proceeding from the upper frame assembly 3 extends back towards the upper frame assembly 3 in a manner inclined relative to the vertical direction Z in each case. The portions of the lifting and pulling means H1-H4 extending in their own lifting and pulling means plane, which portions extend in an inclined manner, in each case form a diagonal portion H1*d*-H4*d*. Said diagonal portions extend such that each diagonal portion H1*d*-H4*d* of a lifting and pulling means H1-H4 intersects with a directly adjacent diagonal portion H1*d*-H4*d*, extending in a manner inclined in the opposite direction, of another lifting and pulling means H1-H4. In this case, the diagonal portions H1*d*, H2*d* of the first lifting and pulling means H1 and of the second lifting and pulling means H2 clearly intersect in the region of a lateral plane of the lifting apparatus, while the two diagonal portions H3*d*, H4*d* of the third lifting and pulling means H3 and of the fourth lifting and pulling means H4 intersect in the region of a lateral plane of the lifting apparatus which is opposite said lateral plane. Since the lifting and pulling means planes of the individual lifting and pulling means H1-H4 are oriented side-by-side and so as to be mutually parallel, the intersection thereof preferably takes place at a certain spacing, and in this respect in a contactless manner. The intersection of the lifting and pulling means H1-H4 serves to stabilize the lower frame assembly 2, which can be deflected relative to the upper frame assembly 3, with respect to a first lateral direction R1 which is transverse to the vertical direction Z. As a result, a deflection of the lower frame assembly 2 with respect to a plane spanned between the longitudinal direction X and the vertical direction Z is effectively prevented.

In contrast, the lower frame assembly 3 is stabilized, with respect to a second lateral direction R2 extending in this case at a right angle to the first lateral direction R1, by oblique pulling means S1-S4, which for this purpose also extend between the two frame assemblies 2, 3. The individual oblique pulling means S1-S4 in each case extend in one of oblique pulling means planes which are located side-by-side and so as to be mutually parallel. In the present case, the oblique pulling means planes are oriented so as to be at right-angles to the lifting and pulling means planes of the lifting and pulling means H1-H4. In each case two directly adjacent oblique pulling means S1-S4 intersect with one another such that the lower frame assembly 2 is also stabilized, relative to the upper frame assembly 3, with respect to the second lateral direction R2. For this purpose, the oblique pulling means S1-S4 can be wound up and unwound by means of a tensioning device which is not visible in greater detail here and is preferably mechanically independent of the raising and lowering device 4. Said tensioning device comprises a tensioning drive (likewise not visible in greater detail) which is coupled to at least one tensioning shaft. In this way, at least two of the oblique pulling means S1-S4 can be wound around the tensioning shaft, at least in part, and unwound therefrom. In principle, it is also possible for at least two tensioning shafts to be provided, which shafts in each case at least two of the oblique pulling means S1-S4 can be wound around, at least in part, and from which said means can be unwound. In this case, the tensioning shafts can be coupled at least indirectly either to their own tensioning drive, in each case, or to a common tensioning drive.

In the first embodiment shown here, the free ends of the lifting and pulling means H1-H4 opposite the end portions of the lifting and pulling means H1-H4 that can be wound around and unwound from the lifting shaft 4*b* are fixed on the upper frame assembly 3. In principle, at least one of the lifting and pulling means H1-H4 and/or of the oblique pulling means S1-S4 can be designed as a strap or belt or cable or chain. Of course, embodiments are also conceivable in which at least one of the lifting and pulling means H1-H4 includes at least one of the mentioned embodiments, at least in part.

Figure 2:
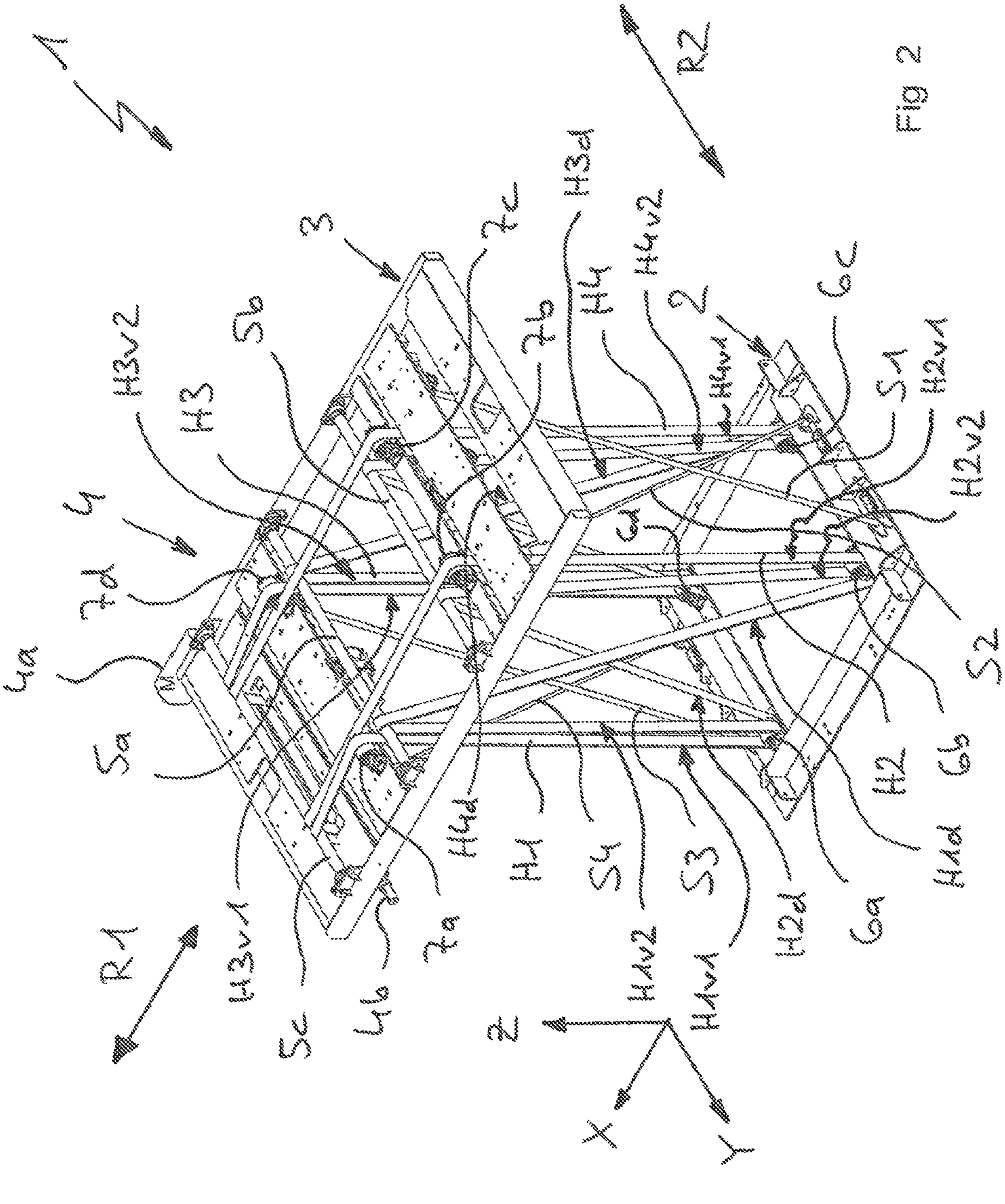
FIG. 2 is a likewise perspective view of a second embodiment of the lifting apparatus according to the invention.

FIG. 2 is a perspective view of a second possible embodiment of the lifting apparatus 1 according to the invention from FIG. 1. The description above with reference to FIG. 1 applies here, the differences therefrom being discussed in the following:

It can thus be seen that, in this alternative embodiment, the individual lifting and pulling means H1-H4 have a changed course. For this purpose, individual deflection means in the form of deflection rollers 7*a*-7*d* are also arranged on the upper frame assembly 3. Proceeding from the third deflection shaft 5*c*, each lifting and pulling means H1-H4 is now first deflected at one of the deflection rollers 7*a*-7*d* arranged in the region of the upper frame assembly 3, towards one of the deflection rollers 6*a*-6*d* which are located substantially therebelow, with respect to the vertical direction Z, on the lower frame assembly 2. Subsequently, each of the lifting and pulling means H1-H4 deflected at the deflection rollers 6*a*-6*d* of the lower frame assembly 2 extends back towards the upper frame assembly 3, where in each case two of the lifting and pulling means H1-H4 are deflected again, together, at one of the two deflection shafts 5*a*, 5*b*, such that they extend back towards the lower frame assembly 2 again, forming the intersecting diagonal portions H1*d*-H4*d* which extend in an inclined manner, and are fixed at said lower frame assembly by their free ends.

On account of the course via the deflection rollers 6*a*-6*d*, 7*a*-7*d* arranged on the two frame assemblies 2, 3, each of the lifting and pulling means H1-H4 comprises a first vertical portion H1*v*1, H2*v*1, H3*v*1, H4*v*1 extending between the two frame assemblies 2, 3, and a second vertical portion H1*v*2, H2*v*2, H3*v*2, H4*v*2 likewise extending between the two frame assemblies 2, 3. In this case, the respective first vertical portions H1*v*1, H2*v*1, H3*v*1, H4*v*1 and second vertical portions H1*v*2, H2*v*2, H3*v*2, H4*v*2 of each lifting and pulling means H1-H4 can extend so as to be mutually parallel. In principle, however, they can also enclose an angle of from 0° to 4° therebetween.

LIST OF REFERENCE SIGNS

1 lifting apparatus
2 lower frame assembly of 1
3 upper frame assembly of 1
4 raising and lowering device of 1
4*a* lifting drive of 4
4*b* lifting shaft of 4
5*a* first deflection shaft of 1
5*b* second deflection shaft of 1
5*c* third deflection shaft of 1
6*a* deflection roller at 2
6*b* deflection roller at 2
6*c* deflection roller at 2
6*d* deflection roller at 2
7*a* deflection roller at 3
7*b* deflection roller at 3
7*c* deflection roller at 3
7*d* deflection roller at 3
H1 first lifting and pulling means of 1
H1*d* diagonal portion of H1
H1*v*1 first vertical portion of H1
H1*v*2 second vertical portion of H1
H2 second lifting and pulling means of 1
H2*d* diagonal portion of H2
H2*v*1 first vertical portion of H2
H2*v*2 second vertical portion of H2
H3 third lifting and pulling means of 1
H3*d* diagonal portion of H3
H3*v*1 first vertical portion of H3
H3*v*2 second vertical portion of H3
H4 fourth lifting and pulling means of 1
H4*d* diagonal portion of H4
H4*v*1 first vertical portion of H4
H4*v*2 second vertical portion of H4
R1 first lateral direction
R2 second lateral direction
S1 first oblique pulling means of 1
S2 second oblique pulling means of 1
S3 third oblique pulling means of 1
S4 fourth oblique pulling means of 1
X longitudinal direction Y transverse direction
Z vertical direction

The invention claimed is:

1. A lifting apparatus (1) for raising and lowering loads or heavy loads, the lifting apparatus (1) comprising:
- two frame assemblies (2, 3), a lower frame assembly (2) and an upper frame assembly (3), which are positioned one above the other with respect to a vertical direction (Z), and are able to be oriented so as to be in parallel with one another;
- lifting and pulling means (H1-H4) each of which extends in a respective lifting and pulling means plane unique to each of the lifting and pulling means (H1-H4), wherein the lifting and pulling means planes are oriented so as to be side-by-side and mutually parallel to each other;
- a tensioning device;
- oblique pulling means (S1-S4) each of which extends in a respective oblique pulling means plane unique to each of the oblique pulling means (S1-S4), wherein the oblique pulling means planes are positioned side-by-side and mutually parallel to each other and are oriented so as to be at right angles to the lifting and pulling means planes, and wherein the oblique pulling means (S1-S4) extend between the two frame assemblies (2, 3) and are able to be wound and unwound by means of the tensioning device;
- a raising and lowering device;
- wherein the lower frame assembly (2) is arranged suspended on the upper frame assembly (3) by a respective one of the lifting and pulling means (H1-H4), such that the lower frame assembly (2) are able to be raised on the upper frame assembly (3) by winding the respective one of the lifting and pulling means (H1-H4) using the raising and lowering device, and the lower frame assembly (2) are able to be lowered with respect to the upper frame assembly (3) by unwinding the respective one of the lifting and pulling means (H1-H4);
- wherein each of the lifting and pulling means (H1-H4) is deflected at least once in the extension thereof in order to stabilize the lower frame assembly (2), which is movable, with respect to the upper frame assembly (3), in at least one first lateral direction (R1) which is transverse to the vertical direction (Z), such that a diagonal portion (H1*d*-H4*d*) of each of the lifting and pulling means (H1-H4), which extends in a first diagonal direction so as to be inclined relative to the vertical direction (Z) as a result, intersects with such a diagonal portion (H1*d*-H4*d*) of another one of the lifting and pulling means (H1-H4), which diagonal portion is directly adjacent and extends in a manner inclined in a second diagonal direction opposite from the first diagonal direction;
- wherein a course of each of the lifting and pulling means (H1-H4), extending in the respective lifting and pulling means plane, also extends between the two frame assemblies (2, 3),
- wherein, for each of the lifting and pulling means (H1-H4), two directly adjacent of the oblique pulling means (S1-S4) intersect with one another such that the lower frame assembly (2), which is movable relative to the upper frame assembly (3) in a second lateral direction (R2) at right angles to the first lateral direction (R1) and transversely to the vertical direction (Z), is stabilized relative to the upper frame assembly (3) and with respect to the second lateral direction (R2).

2. The lifting apparatus (1) according to claim 1, wherein two of the lifting and pulling means (H1-H4) are able to be deflected together, towards the lower frame assembly (2), at a deflection shaft (5*a*, 5*b*) located in the region of the upper frame assembly (3).

3. The lifting apparatus (1) according to claim 1, wherein each of the lifting and pulling means (H1-H4) is deflected towards the upper frame assembly (3), at a first deflection means located in the region of the lower frame assembly (2).

4. The lifting apparatus (1) according to claim 1, wherein each of the lifting and pulling means (H1-H4) is deflected, at a second deflection means located in the region of the upper frame assembly (3), towards the first deflection means located in the region of the lower frame assembly (2), and then deflected towards a deflection shaft (5*a*, 5*b*) located in the region of the upper frame assembly (3).

5. The lifting apparatus (1) according to claim 4, wherein each of the lifting and pulling means (H1-H4) comprises at least one first vertical portion (H1*v*1, H2*v*1, H3*v*1, H4*v*1) which extends between the second deflection means located in the region of the upper frame assembly (3) and the first deflection means located in the region of the lower frame assembly (2), and at least one second vertical portion (H1*v*2, H2*v*2, H3*v*2, H4*v*2) which extends between the first deflection means located in the region of the lower frame assembly (2) and the deflection shaft (5*a*, 5*b*) located in the region of the upper frame assembly (3), the two vertical portions enclosing, therebetween, an angle of from 0° to 4°.

6. The lifting apparatus (1) according to claim 1, wherein a free end of each of the lifting and pulling means (H1-H4) is fixed on the lower frame assembly (2), end portions of each of the lifting and pulling means (H1-H4) that are opposite the free ends being coupled to a lifting shaft (4*b*) of the raising and lowering device (4) which is able to be rotated by a lifting drive (4*a*), and is able to be wound around said lifting shaft, at least in part, and unwound therefrom.

7. The lifting apparatus (1) according to claim 1, wherein a free end of each of the lifting and pulling means (H1-H4) is fixed on the upper frame assembly (3), end portions of each of the lifting and pulling means (H1-H4) that are opposite the free ends being coupled to a lifting shaft (4*b*) of the raising and lowering device (4) which is able to be rotated by a lifting drive (4*a*), and is able to be wound around said lifting shaft, at least in part, and unwound therefrom.

8. The lifting apparatus (1) according to claim 6, wherein the lifting and pulling means (H1-H4) are deflected together, towards the lifting shaft (4*b*) of the raising and lowering device (4) located in the region of the upper frame assembly (3), at a deflection shaft (5*c*) located in the region of the upper frame assembly (3).

9. The lifting apparatus (1) according to claim 1, wherein the tensioning device comprises at least one tensioning drive, which is mechanically independent of a lifting drive (4*a*) of the raising and lowering device (4), which tensioning drive is coupled to at least one tensioning shaft, wherein at least two of the oblique pulling means (S1-S4) are able to be wound and unwound around the tensioning shaft, at least in part.

10. The lifting apparatus (1) according to claim 9, further comprising at least two tensioning shafts, around which tensioning shafts at least two of the oblique pulling means (S1-S4) are able be wound around, at least in part, and from which the oblique pulling means (S1-S4) are able to be unwound, with each of the tensioning shafts being at least indirectly coupled, either to a respective tensioning drive associated with each of the tensioning shafts, or to a common tensioning drive.

11. The lifting apparatus (1) according to claim 1, wherein at least one of the lifting and pulling means (H1-H4) and/or at least one of the oblique pulling means (S1-S4) is selected from the group consisting of a strap, a belt, a cable, and a chain, or includes at least one of said group, at least in part.

* * * * *